United States Patent [19]
Morita et al.

[11] Patent Number: 5,635,286
[45] Date of Patent: Jun. 3, 1997

[54] HEAT SHRINKABLE POLYETHYLENE LAMINATE FILM

[75] Inventors: Syuuichi Morita; Shigeyoshi Koyabu; Tamio Moriyama; Masaaki Tateiwa, all of Yatsushiro, Japan

[73] Assignee: Kohjin Co., Ltd., Tokyo, Japan

[21] Appl. No.: 313,045

[22] PCT Filed: Nov. 2, 1993

[86] PCT No.: PCT/JP93/01588

§ 371 Date: Dec. 21, 1994

§ 102(e) Date: Dec. 21, 1994

[87] PCT Pub. No.: WO95/12490

PCT Pub. Date: May 11, 1995

[30] Foreign Application Priority Data

Nov. 12, 1991 [JP] Japan ................. 322331/1991

[51] Int. Cl.[6] ................. B32B 27/32; B32B 7/02; B65B 53/02
[52] U.S. Cl. ................. 428/213; 428/34.9; 428/35.2; 428/515; 428/516
[58] Field of Search ................. 428/515, 516, 428/910, 213, 349, 35.2; 525/240

[56] References Cited

U.S. PATENT DOCUMENTS 4,985,197  1/1991  Isozaki et al. ................. 264/564
5,306,549  4/1994  Isozaki et al. ................. 428/220

FOREIGN PATENT DOCUMENTS

| | | |
|---|---|---|
| 63-264349 | 11/1988 | Japan . |
| 64-22548 | 1/1989 | Japan . |
| 1-301251 | 12/1989 | Japan . |
| 3-215034 | 9/1991 | Japan . |
| 4-18347 | 1/1992 | Japan . |

*Primary Examiner*—Paul J. Thibodeau
*Assistant Examiner*—D. Lawrence Tarazano
*Attorney, Agent, or Firm*—Armstrong, Westerman, Hattori, McLeland & Naughton

[57] ABSTRACT

A heat shrinkable polyethylene laminate film having an excellent applicability to packaging machines is obtained by forming an intermediate layer composed of a composition comprising as a main component a linear low density polyethylene (A) having a density of 0.910 to 0.930 g/cm$^3$, a melt index of 0.1 to 0.8 g/10 minutes, a total heat of fusion of at least 135 mJ/mg and an endothermic area in the range of not lower than the melting point of at least 12% based on the total endothermic area, and forming innermost and outermost layers composed of a composition comprising as a main component a linear low density polyethylene (B) having a density of 0.910 to 0.930 g/cm$^3$, a melt index of 0.8 to 5.0 g/10 minutes, a total heat of fusion of 135 to 160 mJ/mg and an endothermic area in the range of not lower than the melting point of at least 12% based on the total endothermic area.

5 Claims, 2 Drawing Sheets

| | | |
|---|---|---|
| A | | STRETCHING APPARATUS |
| 1 | | NON-STRETCHED FILM |
| 2 | | LOW SPEED NIP ROLLS |
| 3 | | HIGT SPEED NIP ROLLS |
| 4 | | PREHEATER |
| 5 | | MAIN HEATER |
| 6 | | COOLING AIR RING |
| 7 | | COLLAPSER ROLLS |

| | |
|---|---|
| A | STRETCHING APPARATUS |
| 1 | NON-STRETCHED FILM |
| 2 | LOW SPEED NIP ROLLS |
| 3 | HIGT SPEED NIP ROLLS |
| 4 | PREHEATER |
| 5 | MAIN HEATER |
| 6 | COOLING AIR RING |
| 7 | COLLAPSER ROLLS |

HEAT SHRINKABLE POLYETHYLENE LAMINATE FILM

TECHNICAL FIELD

The present invention relates to a heat shrinkable polyethylene laminate film, and more particularly to a heat shrinkable laminate film made of specific ethylene copolymers, having an excellent applicability to packaging machines.

BACKGROUND ART

Stretched films of polyvinyl chloride, polypropylene, polyethylene and the like are hitherto known as heat shrinkable films. Among them, heat shrinkable polyethylene films have been put to practical use from the viewpoints of possession of heat sealability and low cost. Particularly, in recent years, a heat shrinkable polyethylene film using a linear low density copolymer of ethylene and an α-olefin (hereinafter referred to as "linear low density polyethylene") attracts attention in that the impact resistance and the heat seal strength are excellent, and its utilization in various fields is expected.

The present inventors previously proposed a heat shrinkable film composed mainly of a specific ethylene/α-olefin copolymer (Japanese Patent Publication Kokai No. 62-201229). By practicing this proposed method, it became possible to obtain a film having a less unevenness in thickness and having a better low temperature shrinkability than films obtained by inflation. However, in case of application to automatic packaging machines (such as pillow type packaging machine and automatic packaging machine using centerfold films), the proposed film encounters a problem that a heat seal failure (non-sealing in part) which has not been generated, is generated because the packaging speed of packaging machines is markedly increased in recent years. When packaging is made by automatic packaging machines, it is general to conduct the heat sealing by bead sealing using a heat knife. The sealing failure phenomenon means that a sealed portion is peeled off in a shrinking step, a film is not well cut off with causing stringiness at the sealed portion when a large tension is applied to the film (for example, when bulky goods are packaged), pinholes are generated at the sealed portion, or in an extreme case a film is not sealed at all.

The sealing failure as mentioned above also occurs when a molten resin adheres to the edge of a heat knife or to a heat knife pedestal.

SUMMARY OF THE INVENTION

As a result of making further investigation thoroughly in order to eliminate the above-mentioned sealing failure, the present inventors have confirmed the following matters.

That is to say, as the time until a film is shrinked in a shrinking tunnel is shortened with increase of packaging speed, and when solidification of a molten resin does not proceed within such a short time, a part of the molten resin is drawn apart to produce pinholes, or in an extreme case to cause a complete peeling of the sealed portion.

Also, when a film lacks firmness (when the modulus of tensile elasticity is small), the film is easy to crease at the time of running and, therefore, folding of the film increases at the portion to be sealed by bead sealing, resulting in increase of pinhole formation.

Also, when running property of a film in a packaging machine is insufficient because the film is poor in slipping property, or when articles to be packaged are bulky, the bead seal portion is subject to a larger tension, and a part of the seal portion is drawn apart prior to solidification of the molten resin, thus increasing formation of pinholes.

Further, when the viscosity of the molten resin is low, the molten resin is easy to adhere to the edge of a heat knife and a pedestal for the heat knife, thus pinholes are formed at the sealed portion, or the film is not cut, or in an extreme case the film is not sealed at all.

In order to eliminate the above-mentioned problems and to provide a heat shrinkable film having a good applicability to packaging machines, the present inventors have made a study about a lamination constitution of films and various kinds of raw material resins. As a result, the present inventors have found that a heat shrinkable film having a good packaging machine applicability is obtained by using a resin having a low melt index and a high total heat of fusion and having a proportion of an endothermic area above the melting point which is not less than a certain range, in an intermediate layer in order to accelerate the cooling solidification speed at the time of bead sealing, and by using a resin having a higher melt index than the intermediate layer and similar characteristics to those of the intermediate layer in the innermost and outermost layers so as not to impair the transparency. Thus, the present inventors have arrived at the present invention.

That is to say, the present invention relates to a heat shrinkable polyethylene laminate film biaxially stretched, having an excellent packaging machine applicability, characterized by having a modulus of tensile elasticity of at least 3,000 kg/cm$^2$ and an area shrinkage of at least 20% at 90° C. and including as an intermediate layer at least one layer made of a composition comprising, as a main component, (A) a linear low density polyethylene having a density of 0.910 to 0.930 g/cm$^3$ and a melt index of 0.1 to 0.8 g/10 minutes and showing a fusion curve by DSC wherein the total heat of fusion is at least 135 mJ/mg in a fusion curve obtained when the temperature is kept at 190° C. for 30 minutes, dropped down to 20° C. at a temperature dropping rate of 10° C./minute and then raised at a temperature rising rate of 10° C./minute, and the endothermic area in the range of not lower than the main peak temperature (melting temperature) is at least 12% of the total endothermic area, and including, as an innermost layer and an outermost layer, layers made of a composition comprising, as a main component, (B) a linear low density polyethylene having a melt index of 0.8 to 5.0 g/10 minutes wherein the total heat of fusion in the fusion curve is from 135 to 160 mJ/mg and the endothermic area in the range of not lower than the main peak temperature is at least 12% of the total endothermic area, the thickness of said intermediate layer being at least 60% of all layers.

The linear low density polyethylene (A) used in the present invention as a main component of at least one layer, an intermediate layer, is one having a density of 0.910 to 0.930 g/cm$^3$ and a melt index of 0.1 to 0.8 g/10 minutes, preferably having a density of 0.915 to 0.925 g/cm$^3$ and a melt index of 0.2 to 0.7 g/10 minutes. When the density is less than 0.910 g/cm$^3$, the modulus of tensile elasticity is lowered, and when the density is more than 0.930 g/cm$^3$, the low temperature shrinkability is insufficient. Those having a melt index of less than 0.1 g/10 minutes are not preferable in that the load on a motor at the time of melt extrusion is increased, so the processability deteriorates. When the melt index is more than 0.8 g/10 minutes, the sealability by bead sealing deteriorates.

Also, the above-mentioned linear low density polyethylene (A) is required to be that in the fusion curve in DSC measurement the total heat of fusion is not less than 135 mJ/mg and the endothermic area in the range of not lower than the main peak temperature is not less than 12% of the total endothermic area. Those not satisfying this requirement do not provide a good sealability by bead sealing, since the cooling solidification speed of molten resin is slow.

It is necessary that the thickness of the intermediate layer is not less than 60% of the total thickness of all layers. When the thickness of the intermediate layer is less than 60%, no excellent bead sealing sealability is exhibited.

The linear low density polyethylene (B) used as the main component of each of the innermost layer and the outermost layer is one having a melt index of 0.8 to 5.0 g/10 minutes and having a total heat of fusion in the fusion curve within the range of 135 to 160 mJ/mg and an endothermic area in the range of not lower than the main peak temperature of at least 12% based on the total endothermic area.

When the melt index is less than 0.8 g/10 minutes, the transparency is lowered owing to toughening of the film surface, and when the melt index is more than 5.0 g/10 minutes, heat seal strength is lowered and it also exerts a bad influence on stretching processability. Also, when the total heat of fusion is less than 135 mJ/mg, no good bead sealing sealability is obtained, and when it is more than 160 mJ/mg, lowering of the transparency is observed.

The above-mentioned linear low density polyethylenes (A) and (B) are linear copolymers of ethylene and an α-olefin. The α-olefin to be copolymerized with ethylene is not particularly limited. For instance, there are mentioned α-olefins having 4 to 12 carbon atoms such as butene-1, pentene-1, hexene-1, heptene-1, octene-1,4-methylpentene-1, decene-1, undecene-1, dodecene-1 and the like. Alpha-olefins having 4 to 8 carbon atoms are more preferably used. These linear copolymers (A) and (B) of ethylene and a α-olefin can be easily obtained by a low pressure or medium pressure method using a Ziegler-Natta catalyst. The preparation of these copolymers can be made according to a technique disclosed, for instance, in Japanese Patent Publication Kokoku No. 50-32270 and Japanese Patent Publication Kokai No. 49-35345, No. 55-78004, No. 55-86804 and No. 54-154488.

Also, the resin compositions used in each of the above-mentioned layers may be used alone or in admixture thereof, and further they can be used with polyolefin resins such as high pressure polyethylene, ethylene-vinyl acetate copolymer, ionomer, ethylene-propylene copolymer and the like so long as the objects of the present invention are not hindered.

In addition to the intermediate layer, the innermost layer and the outermost layer, the laminate film of the present invention may include one or more intermediate layers made of a polyolefin resin other than the above-mentioned linear low density polyethylene resins (A) and (B), so long as the above-mentioned requirement for the thickness of the respective layers is satisfied. Examples of the polyolefin resin used in such intermediate layers are linear low density polyethylene resins other than the above-mentioned linear low density polyethylene resins (A) and (B), high pressure polyethylene, ethylene-propylene copolymer and others. They can be suitably selected and used alone or in admixture thereof so long as the objects of the present invention are not hindered.

In addition, additives such as a lubricant, an anti-blocking agent, an antistatic agent and an anti-fog agent can be suitably used for the purpose of imparting their effective actions, as occasion demands. They are particularly effective for use in the innermost layer and the outermost layer.

The preparation of non-stretched films used in the present invention and the stretching can be conducted by known methods. The detailed explanation is given below taking the case of preparation and stretching of a three-layered tubular laminate film.

Firstly, the linear low density polyethylene (A) of ethylene and α-olefin and the linear low density polyethylene (B) of ethylene and α-olefin are melt-kneaded by three extruders, co-extruded in a tubular form through a three-layered circular die so that the linear low density polyethylene (A) forms an intermediate layer and the linear low density polyethylene (B) forms an innermost layer and an outermost layer, and once solidified by rapid cooling without stretching to give a tubular non-stretched film.

The obtained tubular non-stretched film is fed to a tubular stretching apparatus, for instance, as shown in FIG. 1, and is subjected to a simultaneous biaxial orientation by inflation stretching within a temperature range capable of a high degree of orientation, for example, at a temperature lower than the melting point of the intermediate layer resin by at least 10° C., preferably at least 15° C., applying a gas pressure to the inside of the tube. The stretching ratios are not always required to be the same in the longitudinal and transverse directions, but it is preferable for obtaining excellent physical properties such as strength and rate of shrinkage to stretch the film at least 2 times, preferably at least 2.5 times, more preferably at least 3 times, in both the longitudinal and transverse directions.

The film taken out of the stretching apparatus can be annealed if desired, and spontaneous shrinkage during the storage can be inhibited by this annealing.

BEST MODE FOR CARRING OUT THE INVENTION

The present invention is more specifically explained by means of the following Examples, but is not limited to the Examples.

The measurements shown in the Examples were made by the following methods.
1) Total heat of fusion After weighing out 8 to 10 mg of a sample, it was sealed in an aluminum pan. In a differential scanning calorimeter (model DSC-100 made by Seiko Denshi Kabushiki Kaisha), the sample was heated in a nitrogen stream of 30 ml/minute from room temperature to 190° C., kept at that temperature for 30 minutes and then cooled to room temperature at a rate of 10° C./minute. Thereafter, a fusion curve was obtained at a rate of temperature rise of 10° C./minute and the heat of fusion was calculated from the area of endothermic peak by using the fusion curve.
2) Proportion of endothermic area Proportion of the area in the range of not lower than the main peak temperature (melting point) based on the total endothermic area in the above-mentioned fusion curve was represented by percentage (%).
3) Thickness of each layer The thickness of each layer of built-up layers was measured by observing the cross section of a film with a microscope.

4) Haze

An integrating sphere type light transmittance measuring device according to JIS K 6714 was used, and proportion of the transmittance of scattered rays based on the transmittance of parallel rays was represented by percentage (%).

5) Area shrinkage

A film cut in a square of 10 cm×10 cm was dipped in a glycerol bath at a predetermined temperature for 10 seconds, and the rate of area shrinkage was calculated according to the following equation.

$$\text{Rate of area shrinkage} = 100 - A \times B$$

wherein A and B are lengths (cm) in the machine and transverse directions after dipping.

6) Modulus of tensile elasticity

A specimen was cut from a film sample in 15 mm width in MD (machine direction) and 300 mm length in TD (transverse direction), and its thickness was measured.

Figure 2:
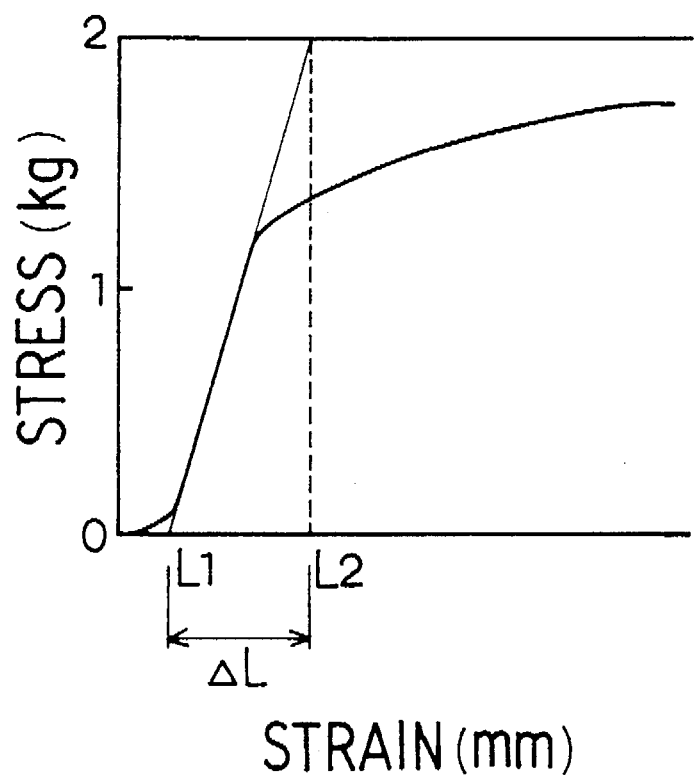
FIG. 2 is a schematic view illustrating a stress-strain curve for calculating a modulus of tensile elasticity in the Examples.

The specimen was then gripped and attached at 50 mm spacing to a universal tensile tester made by Kabushiki Kaisha Orientech, and was measured under conditions of rate of tension 40 mm/minute, rate of recording paper 500 mm/minute and full scale 2 kg. The calculation was made according to the following equation.

$$\text{Modulus of tensile elasticity} = \frac{P/S}{\Delta L/L}$$

wherein P is a strength (kg) of full scale, S is a sectional area (cm$^2$) of a film, $\Delta L$ is a distance (mm) between L1 and L2 in the stress-strain curve shown in FIG. 2, and L is a grip spacing of a specimen.

7) Sealability by bead sealing

A film folded in half having a width of 400 mm was fed to an automatic packaging machine of the type using centerfold films (model AT-500) made by Kyowa Denki Kabushiki Kaisha, and 100 pieces of a lunch box (200 g) having a length of 23.5 cm, a width of 15.5 cm and a height of 5.6 cm were continuously wrapped at a rate of 25 pieces/minute to measure the percent non-defective. Percent non-defective 100% in the sealing temperature range of 220° to 250° C. was estimated as o, percent non-defective between less than 100% and 80% was estimated as Δ, and percent non-defective of less than 80% was estimated as X.

With respect to the standard of the percent non-defective, a case where no stringiness and no pinhole having a size of at least 1 mm are observed in a sealed portion after shrink packaging, is regarded as non-defective.

Also, the percent margin in pre-packaging was set 13% in each of length and width.

EXAMPLE 1

A linear low density polyethylene resin having characteristics as shown in Table 1 which was a copolymer of ethylene and 4-methylpentene-1 comonomer, for an intermediate layer and a linear low density polyethylene having characteristics as shown in Table 1 which was a copolymer of ethylene and octene-1 comonomer, for inner and outer layers were melt-kneaded at a temperature of 170° to 240° C. respectively in three extruders (for the intermediate layer, for the innermost layer and for the outermost layer). The extrusion outputs from the respective extruders were set under the estimation of the thickness ratio shown in Table 1, and they were co-extruded downward from a three-layer circular die kept at 240° C.

The formed three-layer tube was cooled by sliding the inner side on the outer surface of a cylindrical cooling mandrel wherein a cooling water was circulated and by passing the outer side through a water bath, and drawn to give a non-stretched film having a diameter of about 75 mm and a thickness of 320 μm. The adjustment of thickness of each layer was conducted by adjusting the number of revolutions of a screw of an extruder and a drawing speed. This tubular non-stretched film was led to a tubular biaxial stretching apparatus shown in FIG. 1 and stretched 4 times in both machine and transverse directions at a temperature of 95° to 105° C. to give a biaxially stretched laminate film. The stretched film was then treated with a hot air of 75° C. for 10 seconds in a tube annealing apparatus, cooled to room temperature, collapsed and taken up.

The stability during the stretching was good, vertical motion of the stretching point and swaying of the stretched tube did not occur, and also nonuniform stretching state such as necking was not observed. The obtained stretched film had a thickness constitution as shown in Table 1, and had excellent transparency and low temperature shrinkability and a high modulus of tensile elasticity. Also, in estimation by actual packaging of lunch boxes using an automatic packaging machine of the type using centerfold films, there was no failure of sealed portion, thus the film had a good packaging machine applicability in a wide temperature range.

EXAMPLE 2

A heat shrinkable laminate film was prepared in the same manner as in Example 1 using the resin constitution shown in Table 1. The obtained stretched film had excellent transparency and low temperature shrinkability and a high modulus of tensile elasticity. Also, like Example 1, the film had an excellent packaging machine applicability.

EXAMPLE 3

A heat shrinkable laminate film was prepared in the same manner as in Example 1 using the resin constitution shown in Table 1. To the inner and outer layers was added 5,000 ppm of stearic acid monoglyceride as an anti-fog agent. The film had excellent transparency and low temperature shrinkability, a high modulus of tensile elasticity and an excellent packaging machine applicability.

Comparative Example 1

Using a linear low density polyethylene having a melt index of 2.0 g/10 minutes in the intermediate layer and using the same linear low density polyethylene resin as that used for the inner and outer layers in Example 1 in the inner and outer layers, they were extruded under the same conditions as in Example 1, cooled and drawn to give a non-stretched laminate film having a diameter of about 75 mm and a thickness of 320 μm. The adjustment of thickness of each layer was conducted by adjusting the number of rotations of a screw of an extruder and the drawing speed.

Figure 1:
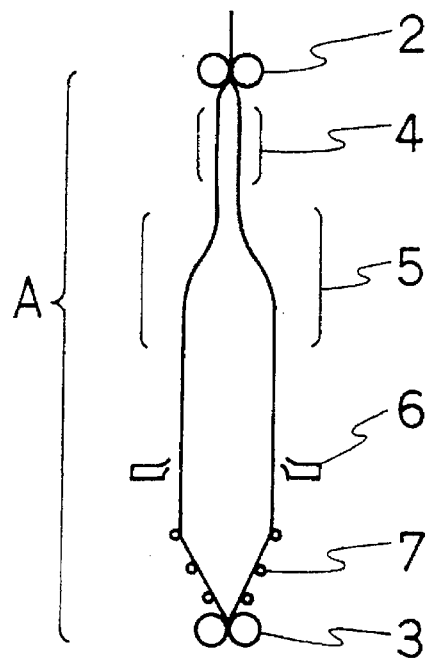
FIG. 1 is a sectional view illustrating a tubular biaxial stretching apparatus used in the Examples.

In the same manner as in Example 1, this tubular non-stretched film was led to the tubular biaxial stretching apparatus shown in FIG. 1 and stretched 4 times in both machine and transverse directions at a temperature of 95° to 105° C. to give a biaxially stretched laminate film. This stretched film was then treated with a hot air of 75° C. for 10 seconds in a tube annealing apparatus, cooled to room temperature, collapsed and taken up.

There was no problem in the stability during stretching and the obtained film had excellent transparency and low temperature shrinkability, but the modulus of tensile elasticity was small. Estimation of the applicability of this film to packaging machine showed that adhesion of a resin to a bead sealing bar and stringiness were somewhat improved, but pinholes were easy to be formed, so the sealability was insufficient.

Comparative Examples 2 and 3

Heat shrinkable laminate films were obtained in the same manner as in Example 1 by using in the intermediate layer for Comparative Example 2 a linear low density polyethylene whose total heat of fusion in the fusion curve was 132.0 mJ/mg which was not more than 135 mJ/mg, and by using in the intermediate layer for Comparative Example 3 a linear low density polyethylene whose ratio of endothermic area in the range of not less than melting point in the fusion curve was 11.0% which was not more than 12% and by using in the inner and outer layers for both Comparative Examples 2 and 3 the same linear low density polyethylene as in Example 1.

Both heat shrinkable films obtained in Comparative Examples 2 and 3 had excellent transparency and low temperature heat shrinkability, but their modulus of tensile elasticity was small. In an actual packaging test using a packaging machine, both films were easy to form pinholes in sealed portion and were insufficient in sealability.

Comparative Example 4

A heat shrinkable laminate film was obtained in the same manner as in Example 1 by using in the intermediate layer the same linear low density polyethylene as in Example 1 and by using in the inner and outer layers a linear low density polyethylene having a melt index of 0.6 g/10 minutes which was not within the range of 1.0 to 5.0 g/10 minutes. The obtained film had an excellent low temperature shrinkability and a large modulus of tensile elasticity and showed a good sealability by bead sealing in actual packaging test using a packaging machine, but it was poor in transparency.

Comparative Example 5

A heat shrinkable laminate film was obtained in the same manner as in Example 1 by using in the intermediate layer the same linear low density polyethylene as in Example 2 and by using in the inner and outer layers a linear low density polyethylene whose total heat of fusion in the fusion curve was 121 mJ/mg which was not within the range of 135 to 160 mJ/mg. The obtained film had excellent transparency and low temperature shrinkability, but it was somewhat inferior in modulus of tensile elasticity, and adhesion of a resin to a heat knife and sticking of the film to a heat knife pedestal were observed in the actual packaging test using a packaging machine, and a hole having a length of about 3 mm was sometimes formed in sealed portion, so the sealability was very unstable.

Comparative Example 6

A heat shrinkable laminate film was obtained in the same manner as in Example 1 by using in the intermediate layer the same linear low density polyethylene as in Example 1 and by using in the inner and outer layers a linear low density polyethylene whose total heat of fusion in the fusion curve was 162.4 mJ/mg which was more than 160 m J/mg. The stability in the stretching step was bad, and the obtained film was inferior in transparency and low temperature shrinkability. In the actual packaging test using a packaging machine, the sealed portion was easy to be wrinkled and some pinholes were observed.

Comparative Example 7

A heat shrinkable laminate film was obtained in the same manner as in Example 1 by using the same linear low density polyethylenes as Example 1 in the intermediate layer and the inner and outer layers except that the proportion of the thickness of the intermediate layer was made 50% of the entire thickness. The obtained film were excellent in transparency and low temperature shrinkability, but some pinholes were observed in sealed portion, so the sealability was insufficient.

INDUSTRIAL APPLICABILITY

The heat shrinkable laminate film of the present invention provides a shrinkable film which has excellent transparency and low temperature shrinkability and a high rate of cooling solidification of a molten resin at the time of bead sealing, because of being formed using raw materials satisfying specific conditions as those for respective layers, and which has an excellent packaging machine applicability because of using raw materials which give a high modulus of tensile elasticity.

TABLE 1-1

| | Unit | Example 1 | Example 2 | Example 3 | Com. Ex. 1 | Com. Ex. 2 |
|---|---|---|---|---|---|---|
| Intermediate layer Resin properties | | | | | | |
| Comonomer | — | 4-methlypentene-1 | 4-methylpentene-1 | 4-methylpentene-1 | 4-methylpentene-1 | butene-1 |
| Density | g/cm³ | 0.920 | 0.920 | 0.920 | 0.920 | 0.914 |
| MI | g/10 min. | 0.5 | 0.6 | 0.5 | 2.0 | 0.8 |
| Melting point | °C. | 124.3 | 122.5 | 124.3 | 124.6 | 118.4 |
| Total heat of fusion | mJ/mg | 142.7 | 147.4 | 142.7 | 140.6 | 132.0 |
| Proportion of endothermic area in the range of not less than melting point | % | 15.3 | 13.1 | 15.3 | 12.3 | 12.7 |
| Setting of thickness proportion | % | 70 | 60 | 80 | 80 | 80 |
| Inner and outer layers Resin properties | | | | | | |
| Comonomer | — | octene-1 | octene-1 | 4-methylpentene-1 | octene-1 | octene-1 |
| Density | g/cm³ | 0.920 | 0.920 | 0.920 | 0.920 | 0.920 |

TABLE 1-1-continued

|  | Unit | Example 1 | Example 2 | Example 3 | Com. Ex. 1 | Com. Ex. 2 |
|---|---|---|---|---|---|---|
| MI | g/10 min. | 1.0 | 1.0 | 2.0 | 1.0 | 1.0 |
| Total heat of fusion | mJ/mg | 155.7 | 155.7 | 140.6 | 155.7 | 155.7 |
| Proportion of endothermic area in the range of not less than melting point | % | 12.6 | 12.6 | 12.3 | 12.6 | 12.6 |
| Additive | — |  |  |  |  |  |
| Thickness proportion (inner layer) | % | 15 | 20 | 10 | 10 | 10 |
| Thickness proportion (outer layer) | % | 15 | 20 | 10 | 10 | 10 |
| Shrinkable laminate film |  |  |  |  |  |  |
| Thickness Intermediate layer | μm | 14.0 | 12.0 | 16.2 | 16.0 | 16.1 |
| Inner layer | μm | 3.1 | 4.0 | 2.1 | 2.1 | 2.0 |
| Outer layer | μm | 3.0 | 4.0 | 2.0 | 1.9 | 1.8 |
| Haze | % | 2.3 | 2.5 | 2.3 | 2.3 | 2.5 |
| Rate of area shrinkage | % | 22.7 | 23.8 | 22.2 | 24.1 | 25.2 |
| Modulus of tensile elasticity | kg/cm$^2$ | 3400 | 3300 | 3300 | 2500 | 2600 |
| Sealability by bead sealing | — | O | O | O | X | X |

TABLE 1-2

|  | Unit | Com. Ex. 3 | Com. Ex. 4 | Com. Ex. 5 | Com. Ex. 6 | Com. Ex. 7 |
|---|---|---|---|---|---|---|
| Intermediate layer Resin properties |  |  |  |  |  |  |
| Comonomer | — | 4-methylpentene-1 | 4-methylpentene-1 | 4-methylpentene-1 | 4-methylpentene-1 | 4-methylpentene-1 |
| Density | g/cm$^3$ | 0.915 | 0.920 | 0.920 | 0.920 | 0.920 |
| MI | g/10 min. | 0.8 | 0.5 | 0.6 | 0.5 | 0.5 |
| Melting point | °C. | 118  8 | 124.3 | 122.5 | 124.3 | 124.3 |
| Total heat of fusion | mJ/mg | 136.8 | 142.7 | 147.4 | 142.7 | 142.7 |
| Proportion of endothermic area in the range of not less than melting point | % | 11.0 | 15.3 | 13.1 | 15.3 | 15.3 |
| Setting of thickness proportion Inner and outer layers Resin properties | % | 75 | 70 | 80 | 70 | 50 |
| Comonomer | — | octene-1 | 4-methylpentene-1 | 4-methylpentene-1 | octene-1 | octene-1 |
| Density | g/cm$^3$ | 0.920 | 0.920 | 0.910 | 0.930 | 0.920 |
| MI | g/10 min. | 1.0 | 0.6 | 2.0 | 0.8 | 1.0 |
| Total heat of fusion | mJ/mg | 155.7 | 147.4 | 120.5 | 162.4 | 155.7 |
| Proportion of endothermic area in the range of not less than melting point | % | 12.6 | 13.1 | 14.1 | 13.5 | 12.6 |
| Additive | — |  |  |  |  |  |
| Thickness proportion (inner layer) | % | 12.5 | 15 | 10 | 15 | 25 |
| Thickness proportion (outer layer) | % | 12.5 | 15 | 10 | 15 | 25 |
| Shrinkable laminate film |  |  |  |  |  |  |
| Thickness Intermediate layer | μm | 15.2 | 13.8 | 16.2 | 14.0 | 10.2 |
| Inner layer | μm | 2.5 | 3.1 | 2.0 | 2.9 | 5.1 |
| Outer layer | μm | 2.4 | 3.1 | 1.9 | 2.9 | 5.0 |
| Haze | % | 2.4 | 5.2 | 2.5 | 6.5 | 2.5 |
| Rate of area shrinkage | % | 24.8 | 20.3 | 28.1 | 18.9 | 23.8 |
| Modulus of tensile elasticity | kg/cm$^2$ | 2700 | 3600 | 2700 | 3700 | 3100 |
| Sealability by bead seating | — | X | O | X | Δ | Δ |

We claim:

1. A biaxially stretched heat shrinkable polyethylene laminate film comprising an intermediate layer, an innermost layer on one side of the intermediate layer and an outermost layer on the other side of the intermediate layer, said intermediate layer being made of a composition comprising (A) a linear low density polyethylene having a density of 0.910 to 0.930 g/cm$^3$ and a melt index of 0.1 to 0.8 g/10 minutes and showing a fusion curve wherein the total heat of fusion is at least 135 mJ/mg, and the endothermic area in the range of not lower than the melting temperature is at least 12% of the total endothermic area, and said innermost and outermost layers made of a composition comprising (B) a linear low density polyethylene having a density of 0.910 to 0.930 g/cm$^3$ and a melt index of 0.8 to 5.0 g/10 minutes and showing a fusion curve wherein the total heat of fusion is from 135 to 160 mJ/mg and the endothermic area in the range of not lower than the melting temperature is at least 12% of the total endothermic area, said fusion curve being measured by a differential scanning calorimeter under conditions that the temperature is kept at 190° C. for 30 minutes, dropped down to 20° C. at a temperature dropping rate of 10° C./minute and then raised at a temperature rising rate of 10° C./minute, and the thickness of said intermediate layer being at least 60% of the thickness of all layers.

2. The heat shrinkable polyethylene laminate film of claim 1, which has a modulus of tensile elasticity of at least 3,000 kg/cm$^2$ and a rate of area shrinkage of at least 20% at 90° C.

3. The heat shrinkable polyethylene laminate film of claim 1, each of the linear low density polyethylenes (A) and (B) are copolymers of ethylene and an α-olefin having 4 to 8 carbon atoms.

4. The film of claim 1, wherein said linear low density polyethylene has a density of 0.915 to 0.925 g/cm$^3$ and a melt index of 0.2 to 0.7 g/10 minutes.

5. The film of claim 1, which further includes at least one other intermediate layer made of a polyolefin other than said linear low density polyethylenes (A) and (B).

* * * * *